(12) United States Patent
Ghotra et al.

(10) Patent No.: US 10,305,321 B2
(45) Date of Patent: May 28, 2019

(54) AUTOMATIC RECOVERY CONTROL (71) Applicant: Eguana Technologies, Calbary, Alberta (CA)

(72) Inventors: Daljit Ghotra, Calgary (CA); Hoang Nguyen, Calgary (CA); Russell J. Morash, Calgary (CA); Keith W. Johnston, Calgary (CA)

(73) Assignee: EGUANA TECHNOLOGIES, Calgary, Alberta, CA (US)

( * ) Notice: Subject to any disclaimer, the term of this patent is extended or adjusted under 35 U.S.C. 154(b) by 71 days.

(21) Appl. No.: 15/426,971

(22) Filed: Feb. 7, 2017

(65) Prior Publication Data
US 2017/0229905 A1    Aug. 10, 2017

Related U.S. Application Data (60) Provisional application No. 62/293,715, filed on Feb. 10, 2016.

(51) Int. Cl.
*H02J 9/06* (2006.01)
*H01M 10/613* (2014.01)
(Continued)

(52) U.S. Cl.
CPC .......... *H02J 9/062* (2013.01); *H01M 2/348* (2013.01); *H01M 10/613* (2015.04);
(Continued)

(58) Field of Classification Search
CPC ...... H02J 7/00; H02J 9/00; H02J 9/062; H02J 7/04; H02J 3/32; H02J 11/00; H02J 3/383;
(Continued)

(56) References Cited

U.S. PATENT DOCUMENTS 5,324,990 A    6/1994  Cunningham
5,834,132 A   11/1998  Hasegawa
(Continued)

FOREIGN PATENT DOCUMENTS

EP    2685582 A1    1/2014
JP   05174964 A    7/1993
(Continued)

OTHER PUBLICATIONS

European Search Report for European Patent Application No. 17155738.2, dated May 19, 2017; 9 pages.
European Search Report for European Patent Application No. 17155724.2, dated Jun. 14, 2017; 9 pages.

*Primary Examiner* — Robert L Deberadinis
(74) *Attorney, Agent, or Firm* — Schwabe Williamson & Wyatt, PC (57) ABSTRACT

An automatic battery recovery system includes a power conversion system (PCS) coupled between an AC power line and a DC power bus. The PCS is configured to convert between DC power from a battery system and AC power from the AC power line. An automatic recovery control (ARC) circuit is coupled in parallel with the PCS between the AC power line and the DC power bus. The ARC circuit is configured to convert AC power from the AC power line into DC power for powering the PCS based on a state-of-charge (SOC) of the battery system. The PCS includes an inverter coupled between the AC power line and the battery system and a digital signal processor (DSP) configured to command the inverter to charge the battery system from the AC power line while the DSP is being powered through the ARC circuit.

25 Claims, 6 Drawing Sheets

DISTRIBUTED ENERGY RESOURCE (DER) SYSTEM
WITH AUTOMATIC RECOVERY CONTROL (51) Int. Cl.
*H01M 10/615* (2014.01)
*H01M 10/663* (2014.01)
*H01M 2/34* (2006.01)
*H02J 7/04* (2006.01)
*H02J 3/32* (2006.01)
*H02J 11/00* (2006.01)
*H02J 3/38* (2006.01)
*H01M 10/42* (2006.01)
*H02J 7/00* (2006.01)
*H02J 7/02* (2016.01)

(52) U.S. Cl.
CPC ....... *H01M 10/615* (2015.04); *H01M 10/663* (2015.04); *H02J 3/32* (2013.01); *H02J 3/383* (2013.01); *H02J 7/04* (2013.01); *H02J 11/00* (2013.01); *H01M 2010/4271* (2013.01); *H02J 7/0047* (2013.01); *H02J 7/0063* (2013.01); *H02J 7/022* (2013.01); *H02J 2007/0095* (2013.01); *Y02B 10/72* (2013.01); *Y02E 10/563* (2013.01); *Y02E 10/566* (2013.01); *Y02E 70/30* (2013.01)

(58) Field of Classification Search
CPC .. H02J 7/0047; H02J 7/022; H02J 2007/0095; H02J 7/0063; H01M 10/613; H01M 10/615; H01M 10/663; H01M 2/348; H01M 2010/4271; Y02E 70/30; Y02E 10/563; Y02E 10/566; Y02B 10/72
See application file for complete search history.

(56) References Cited

U.S. PATENT DOCUMENTS

| | | | |
|---|---|---|---|
| 9,654,028 | B1 | 5/2017 | Luo |
| 10,181,724 | B2 | 1/2019 | Ghotra |
| 2001/0004170 | A1 | 6/2001 | Schienbein |
| 2004/0021445 | A1 | 2/2004 | Harris |
| 2005/0088868 | A1 | 4/2005 | Ryan |
| 2008/0185999 | A1 | 8/2008 | Matsukawa |
| 2011/0304299 | A1 | 12/2011 | Yang |
| 2011/0316489 | A1 | 12/2011 | Norimatsu |
| 2012/0146587 | A1* | 6/2012 | Srinivasan ............. H02J 1/108 320/138 |
| 2013/0106320 | A1 | 5/2013 | Yugo |
| 2014/0217826 | A1 | 8/2014 | Oguchi |
| 2014/0239724 | A1 | 8/2014 | Ishikawa |
| 2015/0022004 | A1 | 1/2015 | Okuda |
| 2017/0229866 | A1 | 8/2017 | Ghotra |
| 2017/0229867 | A1 | 8/2017 | Ghotra |
| 2017/0229872 | A1 | 8/2017 | Ghotra |

FOREIGN PATENT DOCUMENTS

| | | |
|---|---|---|
| KR | 201500090371 A | 8/2015 |
| WO | 2012/049910 A1 | 4/2012 |
| WO | 2013015192 | 1/2013 |
| WO | 2014/080599 A1 | 5/2014 |
| WO | 2014/112925 A1 | 7/2014 |
| WO | 2014/147294 A1 | 9/2014 |
| WO | 2015/128359 A1 | 9/2015 |

* cited by examiner

AUTOMATIC RECOVERY CONTROL

The present application claims priority to U.S. Provisional Patent Application Ser. No. 62/293,715 filed on Feb. 10, 2016, entitled: POWER CONTROL SYSTEMS which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to an automatic recovery system for battery systems.

BACKGROUND

Battery storage systems interact with the power grid through power circuits that convert battery DC power to AC power and vice-versa. These power converters (inverters) rely on switching circuitry and control systems to emulate a sinusoidal waveform necessary for AC power transfer. Such converters are described in U.S. Pat. Nos. 6,608,404 and 7,808,125 which are herein incorporated by reference in their entireties.

At its core, a battery storage control system relies on a digital signal processor (DSP) that is connected to a DC bus powered by the battery system. Problems may arise when the battery system is unable to provide the necessary power to the DSP, which can happen when the battery voltage is too low or there is a functional problem with the battery management system (BMS). These problems may prevent the battery storage system from connecting to the grid, effectively rendering it useless.

Given the relative infancy of grid-interactive energy storage technology, problems maintaining power to control systems will likely emerge in different embodiments as new topologies and products emerge. This needs to be addressed in order to prevent system functionality failures. This problem could impact any control system powered from a DC power bus.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

An automatic recovery control (ARC) circuit enables an inverter controller to start-up using power directly from the grid rather than from a battery system. This is valuable when the state-of-charge (SOC) for the battery system is too low to provide the necessary power or DC bus voltage to operate the inverter controller.

Figure 1:
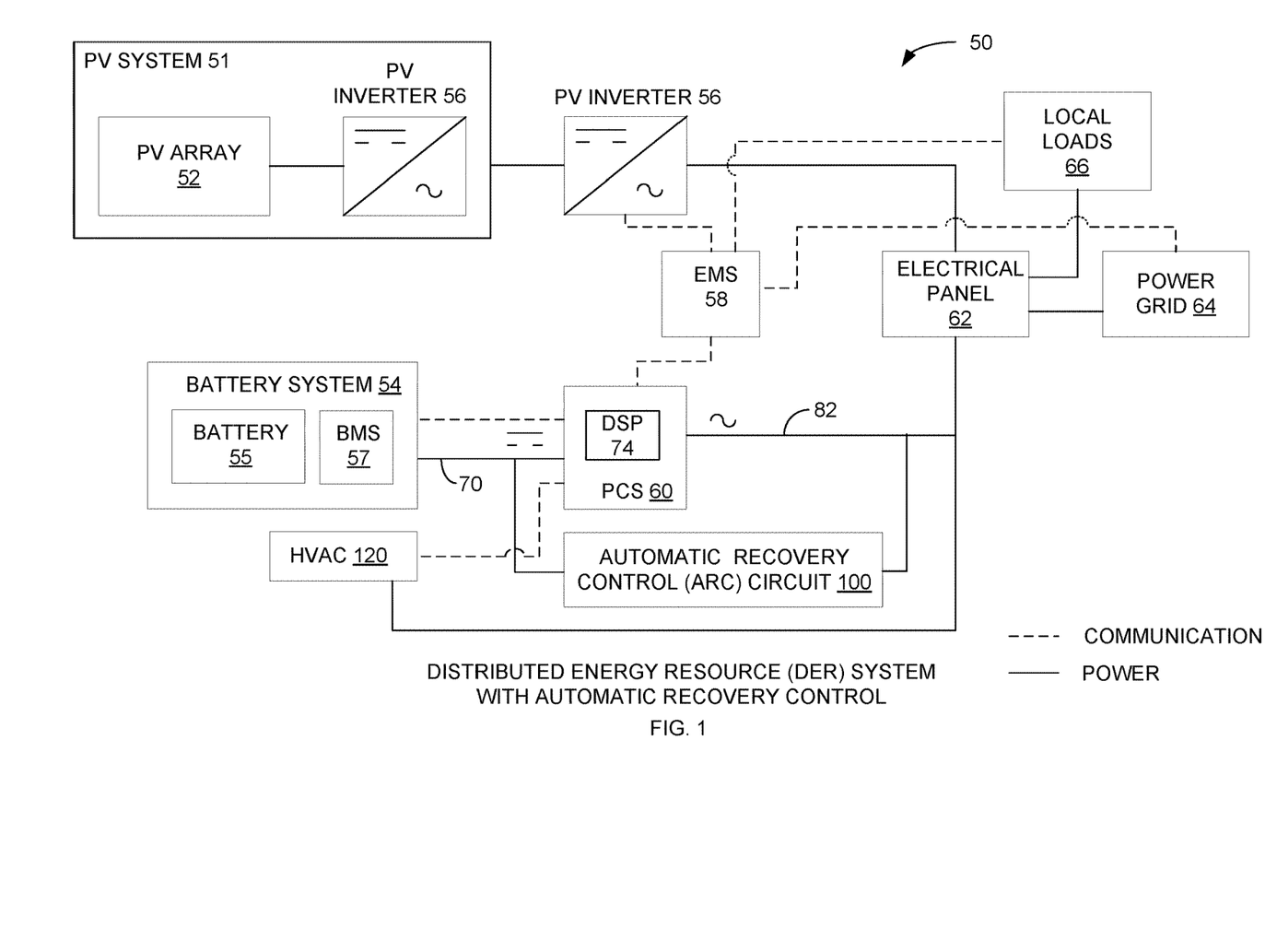
FIG. 1 shows an example distributed energy resource (DER) system that includes an automatic recovery control (ARC) circuit.

FIG. 1 shows a distributed energy resource (DER) system 50. In one example, a photovoltaic (PV) array 52 connects through a PV inverter 56 to an electrical panel 62. A battery system 54 may connect to electrical panel 62 through a power conversion system (PCS) 60. Electrical panel 62 may supply power from PV array 52 and battery system 54 to different local loads 66 and/or to a power grid 64.

PV array 52 may be any type of device capable of converting solar energy into electrical energy. In one example, PV inverter 56 may convert direct current (DC) power from PV array 52 into alternating current (AC) power for different local AC loads 66 and/or other remote AC devices connected to power grid 64. PCS 60 may charge battery system 54 using power supplied by PV array 52 or power grid 64 and also may convert stored DC energy in battery system 54 into AC power for powering local loads 66 and exporting power to the on power grid 64.

DER system 50 may use an energy management system (EMS) 58 to coordinate power flow between PV array 52, battery system 54, local loads 66, and power grid 64. EMS 58 may communicate with other energy sources throughout the power system, manage power flow within DER system 50, and respond to varying grid conditions or dispatch commands.

Battery system 54 typically relies on three main components that interact with each other. These include a battery management system (BMS) 57, PCS 60, and EMS 58. BMS 57 monitors the state and condition of battery 55 and provides protection against unsafe operating states (e.g., high battery cell temperatures). BMS 57 also provides handshaking and information transfer with other power components. Battery 55 can be a single battery or multiple batteries combined within battery system 54.

PCS 60 is a linking element that enables power transfer between battery 55 and loads 66 connected to electrical panel 62. PCS 60 is designed to convert DC power from battery 55 into AC power which may be used to power local loads 66 or to export to the power grid 64. PCS 60 may be bidirectional to convert AC power from power grid 64 and/or PV array 52 into DC power for charging battery 55.

EMS 58 coordinates power flow between power grid 64, battery 55, local loads 66, and PV array 52. EMS 58 may implement algorithms to manage battery charging and discharging based upon electricity price structures such as time-of-use metering or demand charging.

PCS 60 may act as a bridge between BMS 57 and EMS 58. PCS 60 converts power demand signals from EMS 58 into real power flow between the power converter and battery 55. As a result, PCS 60 is uniquely equipped to collect detailed information about battery system 54 in real-time. PCS 60 also has access to physical and operational parameters that would not otherwise be conveyed to EMS 58. For example, PCS 60 may convey battery temperature, instantaneous power, and state of charge of battery system 54 to EMS 58.

PCS 60 includes a digital signal processor (DSP) 74 that manages the switching controls within an inverter power circuit such as the step wave power converter described in U.S. Pat. Nos. 6,608,404 and 7,808,125 which are herein incorporated by reference in their entireties. These controls are based on a feedback process involving a parameter set point, which can be set manually by a user or set through EMS 58.

Other example inverter and bridge circuits used in PV inverter 56 and PCS 60 are described in U.S. Patent Applications such as U.S. Pat. Nos. 6,198,178; 8,031,495; 6,628,011; 6,765,315; 6,738,692; and 7,087,332 which are all also herein incorporated by reference in their entireties.

Battery 55 in battery system 54 may store energy output from PV array 52. A digital signal processor (DSP) 118 operating within PCS 60 may measure current and/or voltage data from both battery system 54 and PV system 51 and perform primary PCS functions in PCS 60, such as power measurements, control, and inverter system switching.

Automatic Recovery Control (ARC)

An automatic recovery control (ARC) circuit 100 operates as a power converter for operating PCS 60 when battery system 54 has insufficient charge. ARC circuit 100 is connected in parallel with PCS 60 between DC bus 70 and AC output 82 of the PCS. When battery 55 is sufficiently charged, battery system 54 generates DC power on DC bus 70 that PCS 60 uses for powering DSP 74. During this battery charged state, ARC circuit 100 may be disabled. Although the ARC is shown connected in parallel with the PCS, the ARC may also be incorporated directly into the PCS 60 circuitry.

Battery 55 may become discharged and not have sufficient power for operating DSP 74. This can occur through a self-discharge mechanism internal to the battery 55 or through excessive discharging into external loads. For example, PV array 52 may not generate power for some period of time and not supply any DC power for recharging battery 55. During this low charge state, ARC circuit 100 may convert AC power from power grid 64 into DC power on DC bus 70 for operating DSP 74. ARC circuit 100 enables recovery from idle battery states by powering PCS 60 through AC grid 64. This may reduce system downtime and improve return on investment.

ARC circuit 100 can be used in any power system that needs to pull a battery system out of an idle state. ARC circuit 100 can power DSP 74 in response to any DC power loss. The subsequent control actions from DSP 74 can then remedy the low charge condition of battery 55 or any other energy storage device that outputs DC power. ARC circuit 100 resolves problems related to deep discharge recovery by enabling battery system 54 to recover from a discharge state that would prevent function of the DER system 50.

ARC circuit 100 also allows battery system 54 to operate deeper into a discharged state and closer to an SOC of 0%. ARC circuit 100 reduces the risk associated with reaching or exceeding a critical charge threshold which would otherwise render battery system 54 unusable. By enabling operation at lower SOC levels, ARC circuit 100 provides access to stored energy capacity in battery 55 that would otherwise be unavailable.

Figure 2:
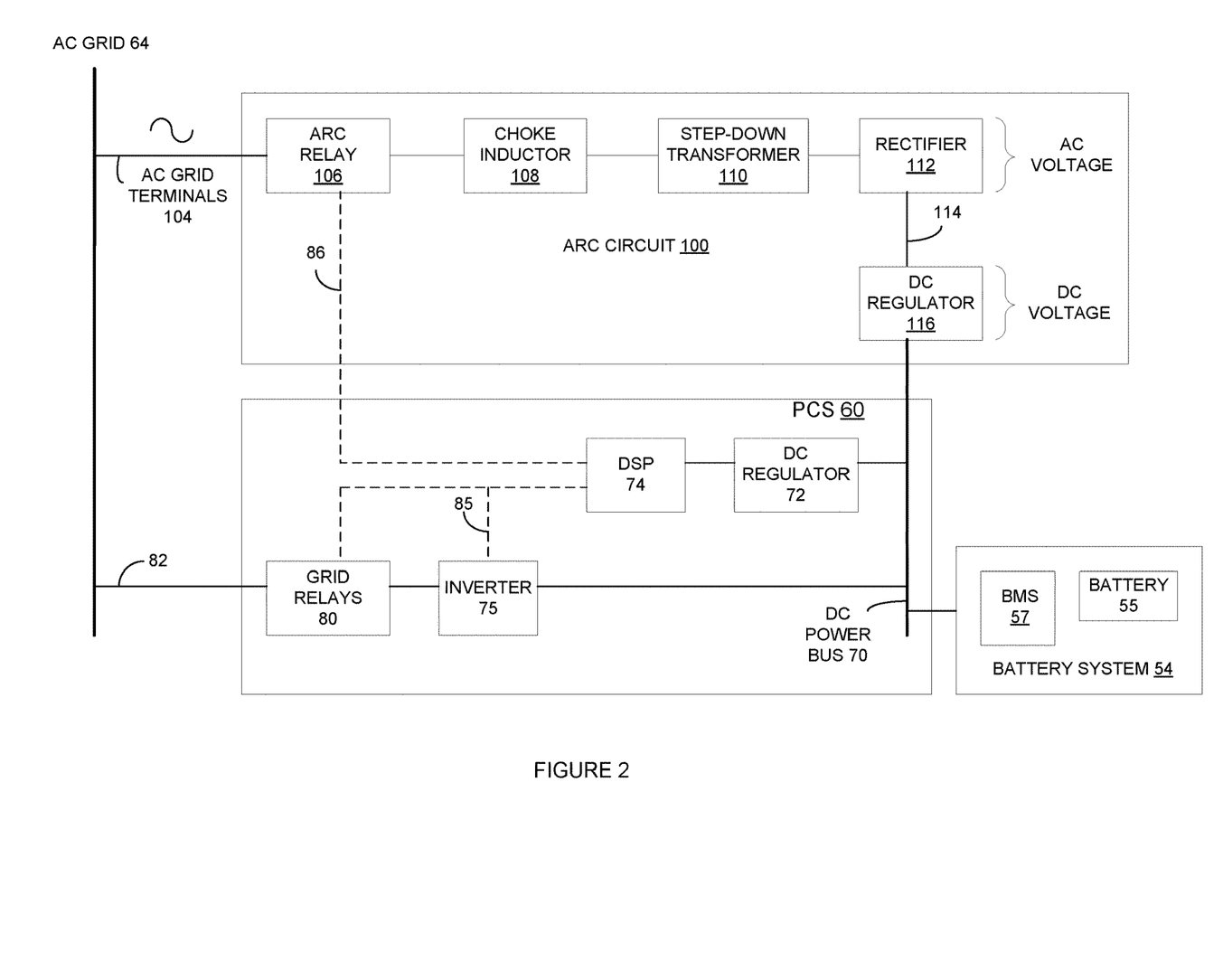
FIG. 2 shows the ARC circuit of FIG. 1 in more detail.

FIG. 2 shows ARC circuit 100 in more detail. ARC circuit 100 includes AC grid terminals 104 that connect to AC grid 64. An ARC relay 106 selectively connects to AC grid 64 and pulls AC power typically at 240 VAC though this could be any voltage level and depends on the characteristics of the local grid. The AC power is passed through a choke inductor/filter 108, step-down transformer 110, and rectifier 112 to produce DC power 114. DC power 114 is passed through a DC regulator 116 and output directly to a DC bus 70. ARC circuit 100 provides galvanic isolation between AC grid 64 and DC bus 70 through step-down transformer 110.

PCS 60 may include a series of DC converters and/or regulators 72 that convert the DC voltage on DC power bus 70 to an operating voltage for powering DSP 74. DSP 74 controls different power conversion operations performed by inverter 75. For example, DSP 74 may command inverter 75 through an internal control path 85 to convert DC power on DC power bus 70 into AC power output on AC grid 64. Alternatively, DSP 74 may configure inverter 75 to convert power from AC grid 64 into DC power for charging battery 55. Inverter 75 is connected to AC grid 64 through grid relays 80.

DSP 74 in PCS 60 also may control ARC relay 106 through a control path 86. For example, relay 106 may operate in a normally open state disconnecting ARC circuit 100 from AC grid 64. DSP 74 may generate control signals on control path 86 that closes relay 106 and connects AC power from grid 64 to ARC circuit 100.

Figure 3:
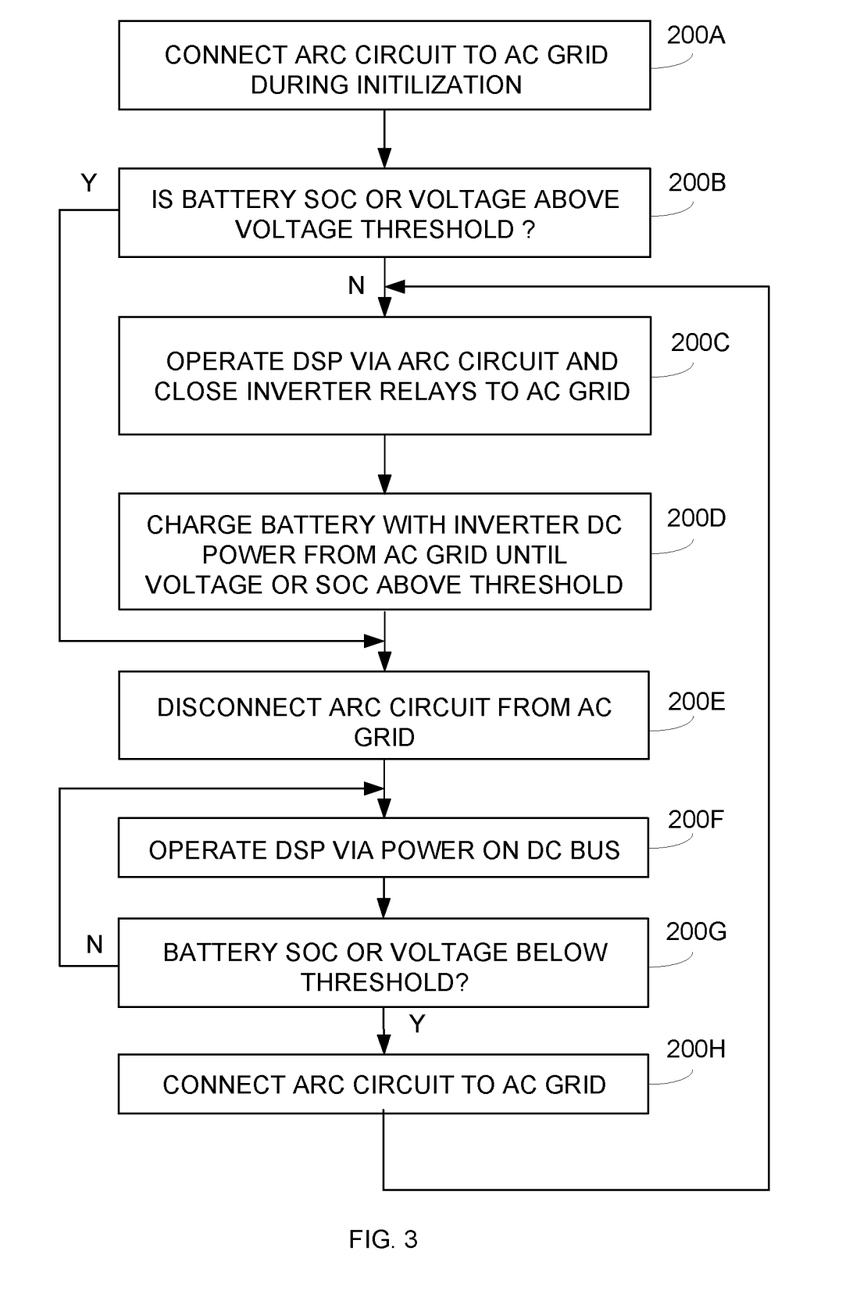
FIG. 3 shows an example ARC process.

FIG. 3 shows an example process performed by DSP 74. Referring to FIGS. 2 and 3, during initialization operation 200A, ARC circuit 100 is automatically connected to AC grid 64 through ARC relay 106. The ARC relay 106 can be normally closed to ensure that the contactors remain closed without requiring a control signal to be sent from the DSP 74. During operation 200A, normally closed relay 106 supplies AC power to choke inductor 108 that regulates AC current. Step-down transformer 110 reduces the AC voltage level and a rectifier 112 converts the AC voltage into DC voltage 114. DC regulator 116 then regulates DC voltage 114 down to the DC voltage level used on DC power bus 70, for example 24 VDC or 48 VDC. DC regulator 72 regulates the DC voltage on DC bus 70 down to the voltage level used for powering DSP 74, for example 3 VDC.

In operation 200B, DSP 74 may measure a voltage or associated SOC for battery system 54. If battery system 54 is above the SOC or output VDC threshold value and passes any other self-check tests, DSP 54 in operation 200E may disconnect ARC circuit 100 from AC grid 64 by opening ARC relay 106.

If the SOC or output VDC of battery 55 is below the threshold in operation 200B, DSP 74 keeps relay 106 closed and ARC circuit 100 remains connected to AC grid 64. At this point, DSP 74 is at least partially powered via the DC power generated by ARC circuit 100 from AC grid 64. If AC grid 64 is not valid for ARC operation, PCS 60 and/or ARC circuit 100 may enter a fault state.

In operation 200C, DSP 74 may close normally open grid connection relays 80. Once relays 80 are closed and a connection established with AC grid 64, DSP 74 in operation 200D commands H-bridges to operate in a rectifier mode and start converting AC power 82 from grid 64 into DC power on DC power bus 70. DC power from inverter 75 is then used for charging battery 55.

In one example, there may be no communication between DSP 74 and BMS 57 (FIG. 1) while ARC circuit 100 is supplying power to DSP 74. In this example, there may be no feedback to DSP 74 indicating the health of battery 55. PCS 60 may measure voltage on DC power bus 70 independently of any charge information provided by BMS 57. To reduce risk of damaging battery 55, inverter 75 may charge battery 55 at a slower rate than normal with a reduced DC power 84, such as 10% of the rated value.

The battery charging in operation 200D continues until the SOC or output VDC of battery 55 reaches a specific threshold. This threshold could be different from the threshold used during initialization operation 200B. This would define a hysteresis band around the recovery operation that would prevent cycling within this state. BMS 57 in battery system 54 may reestablish communication with DSP 74 upon reaching the SOC or battery VDC threshold in operation 200D. DSP 74 can then confirm the proper operating state and charge of battery system 54 through BMS 57.

Upon confirming a sufficient SOC or output VDC for battery 55, DSP 74 in operation 200E disconnects ARC circuit 100 from AC grid 64 by activating and opening ARC relay 106. In operation 200F, DSP 74 reverts back to receiving DC power on DC bus 70 only from battery system 54. Based on the state of PV array 52 and other system parameters DSP 74 may reconfigure inverter 75 to start converting DC power on DC bus 70 into AC power for supplying to grid 64.

As mentioned earlier, the connection of ARC circuit 100 to AC grid 64 is controlled by normally-closed relay 106. Therefore, battery system 54 needs to maintain sufficient power on DC power bus 70 so DSP 74 continues to send control signal 86 that keeps ARC relay 106 open and disconnects ARC circuit 100 from AC grid 64.

If the SOC or output VDC for battery 55 drops below a threshold value during subsequent operation 200G, DSP 74 in operation 200H stops sending control signal 86 causing ARC relay 106 to close reconnecting ARC circuit 100 with AC grid 64. In this way, ARC circuit 100 resets every time the system power is cycled. DSP 74 returns to operation 200C, where ARC circuit 100 again starts generating DC power on DC bus 70 and DSP 74 configures inverter 75 to start recharging battery 55.

Referring back to FIG. 1, ARC circuit 100 also enables recovery from cold-start conditions. It is possible for battery system 54 to have an internal temperature limit below which battery 55 cannot be charged or discharged. If this limit is exceeded, battery system 54 may be rendered unusable until the ambient temperature increases.

Rather than waiting for temperature recovery, power from ARC circuit 100 may enable DSP 74 to route AC power to a heater, a cooler system, and/or an electrical heating, ventilation, and air conditioning (HVAC) unit 120 that can actively raise the temperature of the local environment (e.g., the enclosure containing battery system 54). Hereafter, HVAC will be understood to include any combination of a heater, a cooling system, and an air conditioning system. HVAC 120 is operated until BMS 57 again detects an acceptable temperature. At this point, HVAC 120 is either turned off or continues to provide heat and supplement the battery temperature rise due to internal heat losses, which may be desired in particularly cold environments. Thus, ARC circuit 100 may extend the operational temperature range of battery system 54 through the cold-start capability. This provides access to a system operation regime and near a system operation temperature threshold that would otherwise be unavailable.

Likewise, the battery system 54 may detect an internal temperature that is above which the battery 55 cannot be charged or discharged. If this limit is exceeded, battery system 54 may be rendered unusable until the battery system 54 cools or ambient temperature decreases. Similarly, power from ARC circuit 100 may enable DSP 74 to route power to HVAC unit 120 that can actively lower the temperature of the local environment rather than waiting for the temperature to reduce. In this way, the DER system 50 can be recovered to an operational state more quickly, which reduces downtime. This also extends the operational temperature range of the battery system 54 through hot-start capability. This provides access to a system operation regime and near a system operation temperature threshold that would otherwise be unavailable.

Figure 4:
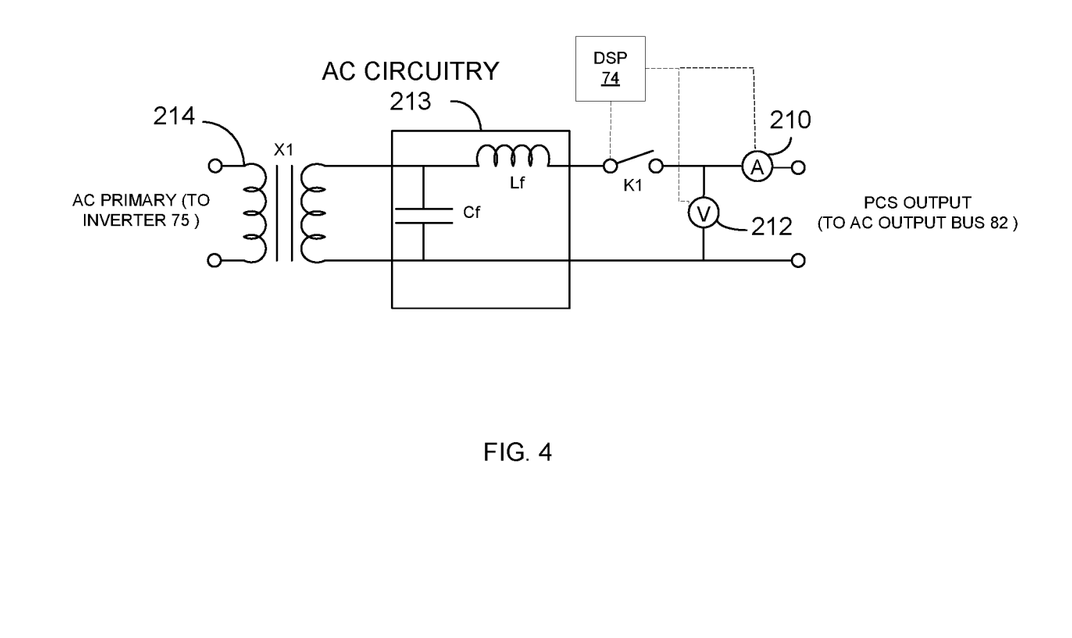
FIG. 4 shows a schematic of the inverter circuit, including the components that drive the inrush current during the ARC process.

FIG. 4 shows the circuitry within PCS 60, including the components that produce the inrush current during the ARC process. A transformer 214 may connect between inverter 75 and AC circuitry 213 within PCS 60. The AC circuitry 213 may include a capacitor Cf and an inductor Lf coupled between transformer 214 and a switch K1. Switch K1 may be one of the grid relays 80 shown in FIG. 2. DSP 74 within PCS 60 may read an AC voltage on AC output bus 82 via a voltage sensing device 212 and read an AC current on AC grid 82 via a current sensing device 210 such as a shunt resistor or current transducer. The AC circuitry 213 within PCS 60 may include other filters, capacitive and inductive elements, and/or current and voltage sensors used for conditioning power output from inverter 75.

Figure 5:
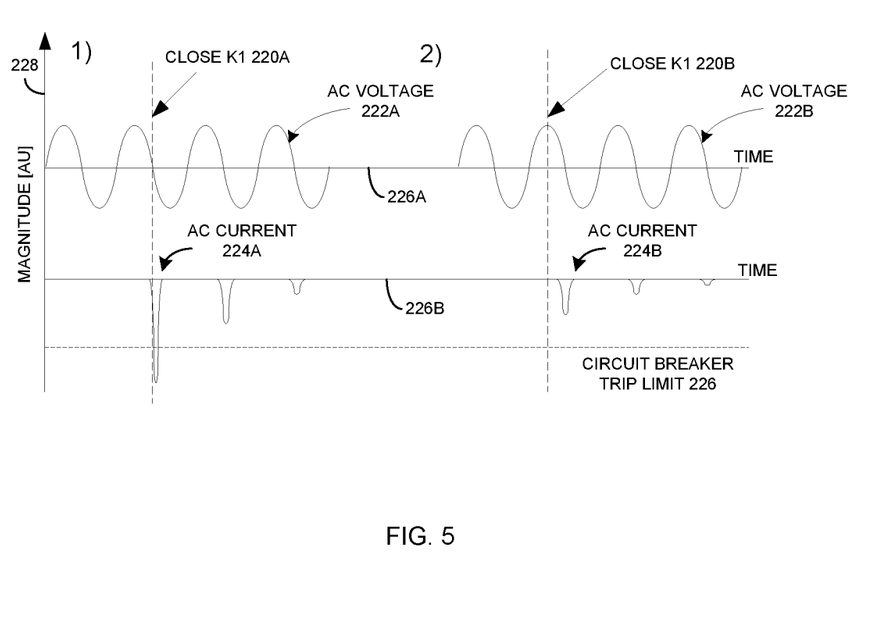
FIG. 5 shows voltage and current waveforms exhibiting how the ARC process reduces inrush current.

FIG. 5 shows current and voltage waveforms that indicate how the ARC process reduces inrush current. The horizontal x-axes 226A and 226B in FIG. 5 represent time and the vertical axes 228 represent magnitude. For example, the vertical axis 228 for the top horizontal axis 226A represents AC voltage and the vertical axis 228 for the bottom horizontal axis 226B represents AC current.

Referring to FIGS. 4 and 5, one of the challenges of implementing the ARC circuit 100 is to reduce inrush current flow 224 during the closing of K1 during operation 200D. AC voltage 222A and AC current 224A show one example of how an unmagnetized transformer and any other magnetic circuit elements may create a large inrush current 224A. During an ARC recovery event, the internal magnetic circuit elements (e.g., transformer 214) are not yet energized. When grid relay K1 is closed, there can be a large current flow 224A to energize the magnetic circuit elements (i.e., magnetizing current). If this is not managed properly, it can exceed the tripping current threshold 226 of external circuit breakers within electrical panel 62, which would subsequently disconnect the PCS 60 and ARC circuit 100 from the AC grid 64.

The magnetizing current 224A is maximized at time near the 180 degrees zero-crossing of the AC voltage waveform 222A from the AC grid 64. Closing grid relay K1 near time 220A creates large inrush current 224A that can trip external circuit breakers. Ideally, the grid relays 80 would be closed at the precise instant that the AC voltage waveform reaches a phase angle of 90 degrees to minimize the magnetizing inrush current. Further details about the characteristics of magnetizing current are well understood in the art and will not be further explained.

For example, the DSP 74 may monitor the AC voltage waveform 222B from the AC grid 64 and issue a command to close K1 at time 220B to synchronize with the 90 degrees phase angle of AC waveform 222B. Transformer 214 then has a partial power cycle to magnetize prior to AC voltage 22B reaching the zero-crossing point. As a result, AC inrush current 224B from AC grid 64 is substantially reduced below circuit breaker trip limit 226.

Practically, there are several factors that should be considered in order to reduce the inrush current. Other elements within the AC circuitry 213 also affect the characteristic impedance at the PCS output terminals once the relay K1 is closed, such as the filter elements Lf and Cf. The control signal latency and mechanical actuation time of the relay must also be considered. As a result, the precise time at which the signal is sent from the DSP to close the relay K1 is tuned to achieve this result of minimized inrush current. This tuning operation is also catered to the particular characteristics (i.e., voltage magnitude, frequency) of the local grid.

Figure 6:
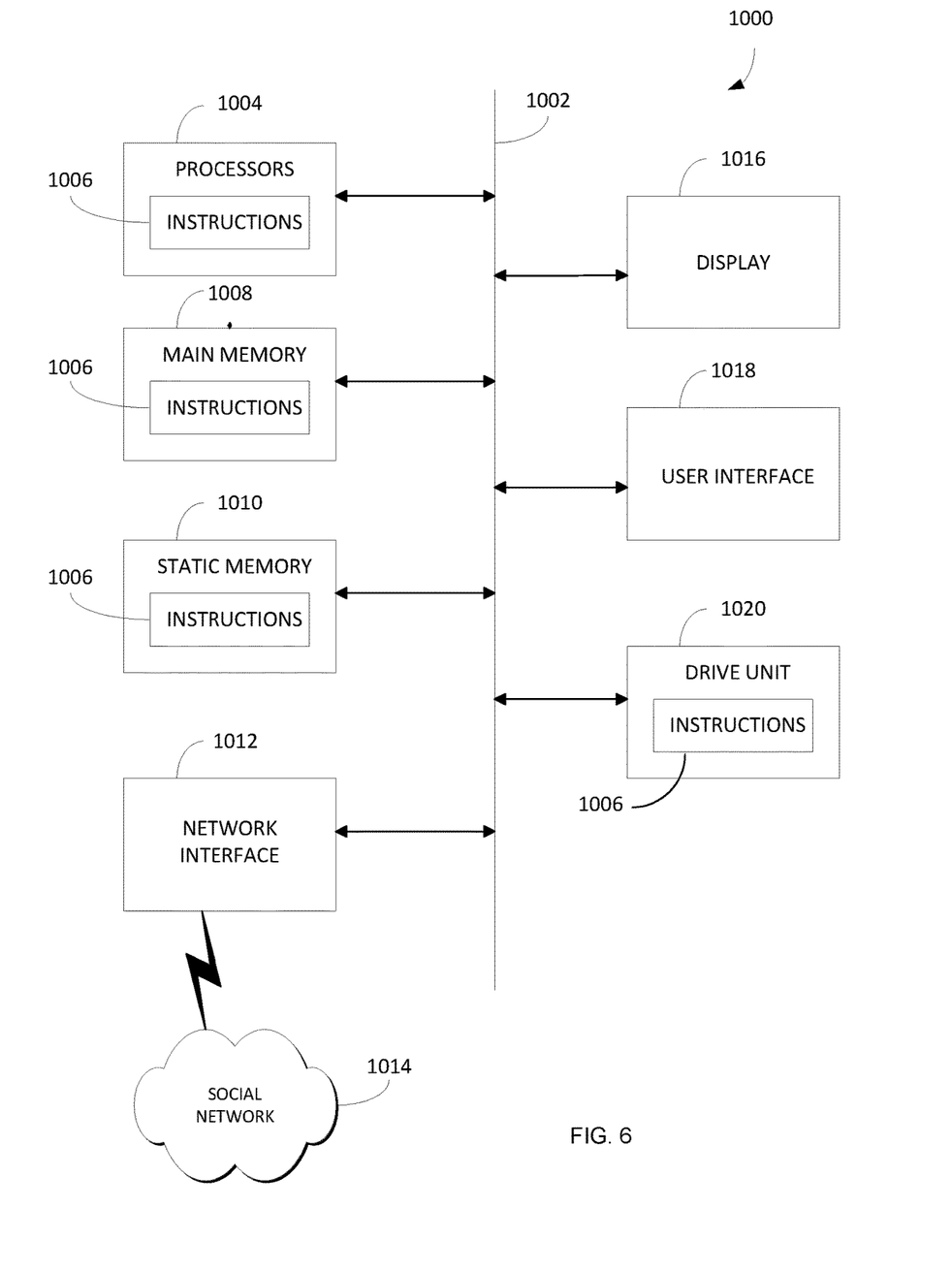
FIG. 6 shows an example computer system used in combination with the ARC circuit.

FIG. 6 shows a computing device 1000 that may be used for implementing or operating in combination with DSP 74, PV inverter 56, PCS 60, EMS 58, ARC circuit 100, and any combination of devices and processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries. Having described and illustrated the principles of a preferred embodiment, it should be apparent that the embodiments may be modified in arrangement and detail without departing from such principles.

The invention claimed is:

1. A battery recovery system, comprising:
an automatic recovery control (ARC) circuit configured to:
connect between an AC power line and a DC bus;
convert AC power from the AC power line into DC power on the DC bus when a low state-of-charge (SOC) or DC voltage in a battery system is insufficient to operate a power conversion system (PCS); and
power the PCS with the DC power generated by the ARC circuit enabling an inverter in the PCS to start charging the battery system from the AC power line.

2. The system in claim 1, wherein the ARC circuit includes:
a normally closed relay coupled to the AC power line; and
an AC to DC rectifier coupled between the relay and the DC bus, the relay connecting the AC power to the rectifier when the low SOC or DC bus voltage is detected.

3. The system in claim 1, wherein powering the PCS through the ARC circuit prompts the PCS to issue a control command to the inverter in the PCS to start charging the battery system from the AC power line.

4. The system of claim 1, wherein a DSP does not communicate with a battery management system (BMS) in the battery system while the PCS is being powered through the ARC circuit.

5. The system in claim 1, wherein raising the SOC or DC voltage in the battery system above a threshold causes the ARC circuit to disconnect from the AC power line and stop powering the PCS.

6. The system in claim 1, wherein the DC power from the ARC circuit powers a DSP in the PCS until the SOC or DC voltage in the battery system is sufficient to power the DSP.

7. An automatic recovery control (ARC) circuit configured to:
connect between an AC power line and a DC bus; and
convert AC power from the AC power line into DC power on the DC bus when a low state-of-charge (SOC) or DC voltage in a battery system is insufficient to operate a power conversion system (PCS), wherein the DC voltage on the DC bus powers the PCS during this state, and wherein the PCS activates a heater for heating the battery system while being powered by the ARC circuit.

8. An automatic recovery control (ARC) circuit configured to:
connect between an AC power line and a DC bus; and
convert AC power from the AC power line into DC power on the DC bus when a low state-of-charge (SOC) or DC voltage in a battery system is insufficient to operate a power conversion system (PCS), wherein the DC voltage on the DC bus powers the PCS during this state, and wherein the PCS activates an air conditioner for cooling the battery system while being powered by the ARC circuit.

9. An automatic recovery control (ARC) circuit configured to:
connect between an AC power line and a DC bus; and
convert AC power from the AC power line into DC power on the DC bus when a low state-of-charge (SOC) or DC voltage in a battery system is insufficient to operate a power conversion system (PCS), wherein the DC voltage on the DC bus powers the PCS during this state, wherein the ARC circuit includes:
a normally closed relay coupled to the AC power line;
an AC to DC rectifier coupled between the relay and the DC bus, the relay connecting the AC power to the rectifier when the low SOC or DC bus voltage is detected;
an inductor coupled to the relay;
a transformer coupled between the inductor and the rectifier; and
a DC regulator coupled between the rectifier and the DC bus.

10. An automatic recovery control (ARC) circuit configured to:
connect between an AC power line and a DC bus; and
convert AC power from the AC power line into DC power on the DC bus when a low state-of-charge (SOC) or DC voltage in a battery system is insufficient to operate a power conversion system (PCS), wherein the DC voltage on the DC bus powers the PCS during the low SOC or DC voltage in the battery system, and wherein the PCS is further configured to:
monitor the AC voltage on the AC power line; and
connect the AC power line to an inverter at a time within the electrical cycle of the AC voltage that reduces inrush current.

11. An automatic battery recovery system, comprising:
a power conversion system (PCS) coupled between an AC power line and a DC power bus, the PCS configured to convert between DC power from a battery system and AC power from the AC power line; and
an automatic recovery control (ARC) circuit coupled in parallel with the PCS between the AC power line and the DC power bus, the ARC circuit configured to convert AC power from the AC power line into DC power for powering the PCS based on a state-of-charge (SOC) of the battery system.

12. The system of claim 11, wherein the PCS includes:
an inverter coupled between the AC power line and the battery system; and
a digital signal processor (DSP) configured to cause the inverter to charge the battery system from the AC power line while the DSP is being powered through the ARC circuit.

13. The system of claim 11, wherein the ARC circuit includes:
a relay coupled to the AC power line; and
an AC to DC rectifier coupled between the relay and the DC power line.

14. The system of claim 12, wherein the DSP is further configured to disconnect the ARC circuit from the AC power line when the SOC or DC voltage of the battery system reaches a threshold.

15. The system of claim 12, wherein the DSP is further configured to allow the inverter to start converting DC power from the battery system into AC power after the battery system reaches the threshold level.

16. The system of claim 12, wherein the DSP does not communicate with a battery management system (BMS) in the battery system while the PCS is being powered through the ARC circuit.

17. The system of claim 12, wherein the ARC circuit includes a normally closed relay connected to the AC power line and the DSP is configured to open the relay based on the SOC or DC voltage of the battery system.

18. The system of claim 17, wherein a power reset of the PCS causes the relay to close and the ARC circuit to supply DC power on the DC power bus for powering the PCS.

19. An automatic battery recovery system, comprising:
a power conversion system (PCS) coupled between an AC power line and a DC power bus, the PCS configured to convert between DC power from a battery system and AC power from the AC power line; and
an automatic recovery control (ARC) circuit coupled in parallel with the PCS between the AC power line and the DC power bus, the ARC circuit configured to convert AC power from the AC power line into DC power for powering the PCS based on a state-of-charge (SOC) of the battery system, wherein the PCS while powered through the ARC circuit activates a heater based on a monitored temperature.

20. An automatic battery recovery system, comprising:
a power conversion system (PCS) coupled between an AC power line and a DC power bus, the PCS configured to convert between DC power from a battery system and AC power from the AC power line; and
an automatic recovery control (ARC) circuit coupled in parallel with the PCS between the AC power line and the DC power bus, the ARC circuit configured to convert AC power from the AC power line into DC power for powering the PCS based on a state-of-charge (SOC) of the battery system, wherein the PCS while powered through the ARC circuit activates a cooling system based on a monitored temperature.

21. An automatic battery recovery system, comprising:
a power conversion system (PCS) coupled between an AC power line and a DC power bus, the PCS configured to convert between DC power from a battery system and AC power from the AC power line; and
an automatic recovery control (ARC) circuit coupled in parallel with the PCS between the AC power line and the DC power bus, the ARC circuit configured to convert AC power from the AC power line into DC power for powering the PCS based on a state-of-charge (SOC) of the battery system, wherein:

the PCS includes:

an inverter coupled between the AC power line and the battery system, and a digital signal processor (DSP) configured to cause the inverter to charge the battery system from the AC power line while the DSP is being powered through the ARC circuit and the DSP is further configured to:

monitor the AC power from the AC power grid, and activate a relay to connect the AC power to the inverter at a time within the electrical cycle of the AC power that reduces inrush current.

22. A method for recovering a battery system, comprising:
a digital signal processor (DSP); and
memory storing one or more stored sequences of instructions which, when executed by the DSP, cause the DSP to carry out the steps of:
enabling an automatic recovery control (ARC) circuit to convert AC power from an AC power grid into DC power for powering the DSP when a SOC or DC voltage of the battery system is insufficient or considered insufficient to power the DSP;
enabling an inverter to charge the battery system from the AC power grid while being powered through the ARC circuit; and
disabling the ARC circuit when the SOC is sufficient to power the DSP.

23. The method of claim 22, wherein the instructions further cause the DSP to carry out the steps of:
enabling the ARC circuit by removing a control signal that puts a relay in the ARC circuit into a normally closed state; and
disabling the ARC circuit by generating the control signal that puts the relay into an open state.

24. The method of claim 22, wherein:
the DSP is located in a power conversion system (PCS) that controls the SOC of the battery system; and
the ARC circuit is coupled in parallel with the PCS between the AC power grid and a DC power bus.

25. The system of claim 24, wherein the ARC circuit includes:
a normally closed relay coupled to the AC power grid; and
a power conversion circuit coupled to the relay that converts the AC power from the AC power grid into the DC power on the DC power bus for powering the DSP.

* * * * *